(12) United States Patent
Novello et al.

(10) Patent No.: US 10,851,576 B2
(45) Date of Patent: Dec. 1, 2020

(54) ANTI-PINCH CIRCUIT DEVICE FOR AN APPARATUS FOR AUTOMATIC MOVEMENT OF SLIDING WINDOWS IN A MOTOR VEHICLE, AND CORRESPONDING METHOD

(71) Applicant: AUTOMOTIVE LIGHTING ITALIA S.p.A., Turin (IT)

(72) Inventors: Andrea Novello, Turin (IT); Andrea Bussi, Turin (IT); Carlo Vai, Turin (IT); Carlo Gallo, Turin (IT)

(73) Assignee: AUTOMOTIVE LIGHTING ITALIA S.p.A., Turin (IT)

( * ) Notice: Subject to any disclaimer, the term of this patent is extended or adjusted under 35 U.S.C. 154(b) by 177 days.

(21) Appl. No.: 15/767,335

(22) PCT Filed: Nov. 2, 2016

(86) PCT No.: PCT/IB2016/056588
§ 371 (c)(1),
(2) Date: Apr. 10, 2018

(87) PCT Pub. No.: WO2017/077461
PCT Pub. Date: May 11, 2017

(65) Prior Publication Data
US 2018/0298668 A1 Oct. 18, 2018

(30) Foreign Application Priority Data
Nov. 6, 2015 (IT) .......................... 102015000070045

(51) Int. Cl.
*E05F 15/41* (2015.01)
*H02H 7/085* (2006.01)
(Continued)

(52) U.S. Cl.
CPC ............. *E05F 15/41* (2015.01); *B60J 5/0412* (2013.01); *E05F 15/697* (2015.01);
(Continued)

(58) Field of Classification Search
CPC .... H02P 29/032; H02P 29/40; H02P 2205/01; H02H 7/08; E06B 3/70; E06B 5/16; E06B 3/46; E05D 15/06; E05F 15/41
See application file for complete search history.

(56) References Cited

U.S. PATENT DOCUMENTS 5,838,126 A * 11/1998 Llerena ................... G05B 19/42
318/286
6,864,654 B1 * 3/2005 Letor .................... H02H 7/0851
318/432
(Continued)

FOREIGN PATENT DOCUMENTS

EP 1389817 A1 2/2004
EP 2324566 A2 5/2011
(Continued)

OTHER PUBLICATIONS

International Search Report and Written Opinion of the International Searching Authority for PCT International Application No. PCT/IB2016/056588 dated Feb. 2, 2017.

*Primary Examiner* — Eduardo Colon Santana
*Assistant Examiner* — Said Bouziane
(74) *Attorney, Agent, or Firm* — Howard & Howard Attorneys PLLC

(57) ABSTRACT

An apparatus for automatic movement of sliding windows in a motor vehicle, comprising a d.c. electric motor that moves a window (F) so that it slides along guides, including an electronic control module for controlling the d.c. electric motor, in particular a microprocessor. The electronic control module measures a current (I) of the motor and a position (X) of the window (F), and drives reversal of operation of
(Continued)

the electric motor if it is verified that the current (I) is higher than a threshold current ($I_{th}$) and the position (X) of the window (F) falls within a given zone (APZ) of a path (P) of movement of the window (F). The anti-pinch circuit device measures a back electromotive force (E; $E_m$) of the motor, and the electronic control module calculates the position of the window (F) as a function of the back electromotive force (E; $E_m$) of the motor.

7 Claims, 6 Drawing Sheets

(51) Int. Cl.
*E05F 15/697* (2015.01)
*H02P 7/03* (2016.01)
*B60J 5/04* (2006.01)
*H02P 7/29* (2016.01)

(52) U.S. Cl.
CPC ............ *H02H 7/0851* (2013.01); *H02P 7/04* (2016.02); *H02P 7/29* (2013.01); *E05Y 2201/232* (2013.01); *E05Y 2201/438* (2013.01); *E05Y 2400/32* (2013.01); *E05Y 2400/334* (2013.01); *E05Y 2400/40* (2013.01); *E05Y 2400/44* (2013.01); *E05Y 2400/512* (2013.01); *E05Y 2900/55* (2013.01)

(56) References Cited

U.S. PATENT DOCUMENTS

| | | | |
|---|---|---|---|
| 6,906,487 B2 * | 6/2005 | de Frutos | H02H 7/0851 318/280 |
| 2010/0037523 A1 * | 2/2010 | Oirsouw | E05F 15/603 49/32 |
| 2011/0270558 A1 | 11/2011 | Knezevic et al. | |
| 2015/0137717 A1 * | 5/2015 | Ishikawa | B25F 5/00 318/379 |

FOREIGN PATENT DOCUMENTS

| | | |
|---|---|---|
| GB | 2221769 A | 2/1990 |
| WO | 2010028736 A2 | 3/2010 |

* cited by examiner

ANTI-PINCH CIRCUIT DEVICE FOR AN APPARATUS FOR AUTOMATIC MOVEMENT OF SLIDING WINDOWS IN A MOTOR VEHICLE, AND CORRESPONDING METHOD

CROSS-REFERENCE TO RELATED APPLICATIONS

The present application is a National Stage of International Patent Application No. PCT/IB2016/056588, filed on Nov. 2, 2016, which claims priority to and all the benefits of Italian Patent Application No. 102015000070045, filed on Nov. 6, 2015, both of which are hereby expressly incorporated herein by reference in their entirety.

BACKGROUND OF THE INVENTION

1. Field of the Invention

The present invention relates to an anti-pinch circuit device for an apparatus for automatic movement of sliding windows in a motor vehicle, in particular a power-window apparatus, comprising a d.c. electric motor that moves a window so that it slides along guides, the device comprising an electronic control module for controlling the d.c. electric motor, in particular a microprocessor. The electronic control module acts to measure the current of the motor and for measuring a position of the window, and drives reversal of operation of the electric motor if the current is higher than a threshold value and the position of the window falls within a given zone of movement of the window.

The above techniques are described herein with specific reference to power-window apparatuses of a motor vehicle, but may also refer to other motor-drives for windows, or equivalent elements, such as panels, along guides provided on the vehicle, such as an openable sun roof, which run the risk of causing pinching.

2. Description of the Related Art

Power-window apparatuses are devices constituted by an electro-mechanical system that displaces a window in just two directions in space by constraining the window, on two sides, to a path constituted by two parallel guides. The window slides along the two guides with the aid of a system of levers driven by a d.c. electric motor.

The direction of rotation of the rotor of the electric motor, fitted on which is a shaft connected to the aforesaid system of levers, determines the direction of movement of the window.

Semiautomatic or automatic operation of the power-window apparatus inserted in the door of a motor vehicle envisages the presence of a d.c. electric motor (where displacement of the window depends directly upon the pressure exerted on a pushbutton and ceases as the pressure ceases), in particular controlled automatically by an electronic circuit. In the automatic operating mode, a so-called anti-pinch safety function is usually envisaged. In the automatic mode, in fact, displacement of the window is a consequence of pressure exerted on a pushbutton connected to an electronic circuit that controls operation of the electric motor. The electronic control circuit interprets, in addition to the information "pushbutton pressed/pushbutton released", also the boundary conditions, such as the current in the motor, the value of which increases instantaneously at the instant when the motor is blocked following upon arrest of the window, either because the end-of-travel has been reached or because an obstacle has been encountered along the path of the window. Hence, in the automatic mode, the power-window system is able to evaluate conditions regarding safety, and it is possible to introduce an anti-pinch function, which consists in reversal of the direction of upward motion of the window when an obstacle is encountered or when the motion proves problematical, for example in the case where a person's fingers happen to be in the way and hence risk getting pinched (with evident traumatic consequences) between the window that is going up and the top edge of the power-window frame.

The reliability and high sensitivity of the anti-pinch system must enable automatic reversal of motion of the window in the presence of an obstacle; the system is hence in this regard calibrated to respond positively to stringent testing conditions.

In particular, the standards (FMVSS118 (USA)—74/60/EEC (Europe)) define as anti-pinch zone a zone comprised between 4 mm and 200 mm beneath the top end-of-travel (or top edge of the power-window frame). The tests to which the system is subjected envisage that the window, in the presence of an obstacle, must not exert a force higher than 100 N with objects that can have a deflection ratio between 5 Nm and 20 Nm.

FIG. 6 is a schematic representation of an example of a power-window apparatus designated as a whole by the reference number 50. The apparatus 50 comprises a motor M that turns with an angular velocity $\omega$ about an axis of rotation and, through a motor reducer 51, actuates a sliding cable 55, which, via two sliding rollers 56 and 57 set at the bottom end 57 and the top end 56 of a path of travel CF of a window F between a top end-of-travel CFu and a bottom end-of-travel CFd, moves a window engagement element 52, connected to the window F, to get the aforesaid window to slide in a guide 54 along a path designated by P (for simplicity indicated as being purely vertical in the drawing). The window F moves along the path P with a linear velocity v, which in general is directly proportional to the angular velocity $\omega$ via a constant that is determined, among other parameters, by the reduction ratio of the motor reducer 51. Designated by 53 are elements for engagement of the apparatus 50 to the door. Denoted by APZ is an anti-pinch zone defined along the path P with respect to the top end-of-travel CFu.

Simple power-window apparatuses are known that do not comprise position sensors, but process parameters such as the resistivity of the rubber weatherproofing set between the glass of the window and the slide guides, which, with an appropriate calibration of the points of measurement, varies as a function of the position of the window. However, the precision that may be achieved, which is the most important parameter for an effective anti-pinch system, is not very high.

It is known to operate in a more precise way by storing, using an electronic control circuit, the position of the window after an appropriate calibration, exploiting the top end-of-travel and bottom end-of-travel, via integration of a sensor (the type of sensor most widely used for such applications is a Hall-effect sensor, with an encoder mounted on the printed circuit, which is in turn arranged in the proximity of a disk that is fitted on the motor shaft and contains the magnets), and processing, via the electronic circuit, a series of parameters (both parameters characteristic of the electric motor itself and parameters linked to the circuit, such as the value of current that varies as a function of friction) so as to evaluate the friction of the system in order to adapt to possible variations, not only ones occurring in the short term but also those due to ageing. This system is more precise, but requires the exact knowledge of the electrical parameters of the motor used during calibration of the system; i.e., for instance, any possible replacement of the electric motor must be made with a motor of the same model or with the same characteristics; otherwise, the initial characteristics and performance are not guaranteed. Furthermore, the system requires a specific sensor for detecting the position of the window.

SUMMARY OF THE INVENTION

The object of the present invention is to provide an improved apparatus that will enable exact determination of the position of the window along its path without the aid of external sensor means and that will be independent of the typical (and parasitic) parameters of the system, in particular of the electric motors.

According to the present invention, the above object is achieved thanks to an electronic power-window apparatus comprising a d.c. electric motor, as well as to a corresponding method for controlling the apparatus, including a d.c. electric motor that moves a window (F) so that it slides along guides. The device includes an electronic control module for controlling the d.c. electric motor, in particular a microprocessor. The electronic control module measures a current (I) of said motor and a position (X) of the window (F) and drives reversal of operation of the electric motor if it is verified that the current (I) is higher than a threshold current ($I_{th}$) and the position (X) of the window (F) falls within a given zone (APZ) of a path (P) of movement of the window. The anti-pinch circuit device measures a back electromotive force (E; $E_m$) of the motor, and the electronic control module calculates the position of the window (F) as a function of the back electromotive force (E; $E_m$) of the motor so as to operate without the aid of external sensors.

Other objects, features and advantages of the present invention will be readily appreciated as the same becomes better understood after reading the subsequent description taken in connection with the accompanying drawings.

BRIEF DESCRIPTION OF THE DRAWINGS

The invention will now be described with reference to the annexed drawings, which are provided purely by way of non-limiting example and in which.

DETAILED DESCRIPTION OF THE INVENTION

In brief, the solution according to the invention in general envisages exploitation in the power-window apparatus of the physical quantities proper to the d.c. motor (the back electromotive force and the current absorbed by the motor) to acquire information on the position of the rotor of the motor, and determine the condition of jamming or pinching without the aid of external sensors. This solution is robust in regard to the parasitic parameters linked to the electric motor being used via adoption of a particular calibration procedure.

Figure 1:
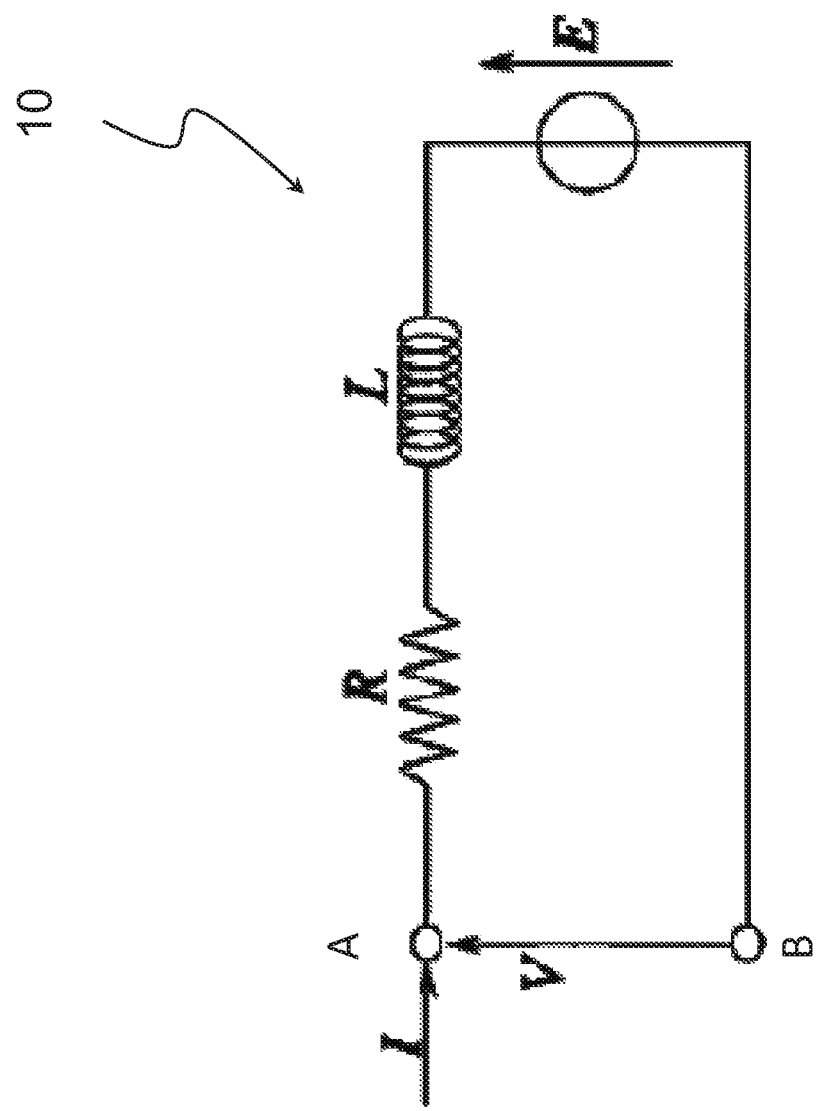
FIG. 1 represents the equivalent electrical model of a d.c. electric motor.

Illustrated in FIG. 1 is an electrical circuit that represents schematically, in a way in itself known, a d.c. electric motor 10 of a power-window apparatus.

Designated by A and B are terminals of the electric motor 10, while V denotes a voltage that is present on the terminals A and B of the electric motor 10, R is a parasitic resistance of the motor 10, L is a parasitic inductance of the motor 10, and E is a back electromotive force (back EMF) of the electric motor 10 that is proportional to an angular velocity ω of the motor.

From the circuit of FIG. 1 it may be understood how the electric motor 10 as a whole is defined as a voltage generator, where the voltage is the back electromotive force E, added to which is the voltage drop due to the parasitic resistance $V_R$=R·I and a voltage drop due to the parasitic inductance $V_L$=L·dI/dt, both of which are linked to the windings of the motor 10. We thus have the relation, in itself known, for the voltage V on the terminals A and B of the motor 10:

$$V = RI + L\frac{dI}{dt} + E$$

By applying a voltage across the terminals A and B of the electric motor 10, it rotates about its own axis (fitted on which is a shaft); its velocity of rotation ω will be proportional to the value of the voltage applied.

Likewise, if the rotor of the motor 10 is made to turn from outside, across the terminals A and B of the motor 10, the voltage V is read, the value of which will be proportional to the r.p.m., i.e., to the velocity of rotation ω.

Being independent of the characteristic parameters of the motor 10, so that it can be replaced with an equivalent one, hence means being able to know the exact value of the voltage of the generator of back electromotive force E, by reading the value V thereof across the motor 10, i.e., between the terminals A and B.

To obtain a voltage V equal to the back electromotive force E and hence measure the back electromotive force E, it is necessary to render the voltage due to the parasitic resistance zero, namely, $V_R$=0, and the same applies to the voltage due to the parasitic inductance, namely, $V_L$=0.

To satisfy the two conditions set forth above, the current I that flows in the electric motor 10 must be zero, i.e., I=0, which means not supplying the electric motor. In this circumstance, the voltage V read across the terminals A and B can be considered equal to that of the voltage generator E of its theoretical representation since the voltage V that is read is produced by the motor 10 itself, which carries on turning by inertia (thus becoming a voltage generator).

Hence, the method envisages supplying the motor 10 and then interrupting supply to read the back electromotive force E, which corresponds to the voltage V. For this purpose, the electric motor 10 is supplied and not supplied with a predefined timing, in particular resorting to the PWM (Pulse-Width Modulation) technique. The PWM mode of supply of a d.c. motor is in itself known to a person skilled in the sector and for the electric motor 10 envisages, given a total period $t_{tot}$=$t_1$+$t_2$, applying on the terminals A and B of the motor 10 a voltage V for a first period corresponding to an ON time $t_1$ and applying a zero voltage, V=0, for a subsequent period corresponding to an OFF time $t_2$. This means that a voltage value is applied to the electric motor 10 that is averaged as a function of the lengths of the ON time $t_1$ and of the OFF time $t_2$; in particular, if $t_1=t_2$ this is equivalent to supplying the motor with a voltage value equal to half of the value applied.

At the instant when the voltage applied to the motor 10 is removed, at the end of the ON time $t_1$ the resistive parasitic voltage $V_R$ instantaneously goes to zero; instead, the inductive parasitic voltage $V_L$ goes to zero after a transient (time for discharge of the inductance L). The method described herein envisages reading the voltage value V on the terminals A and B at the instant when the inductive parasitic voltage $V_L$ goes to zero. In this way, the reading is free from parasitic phenomena.

Figure 2:
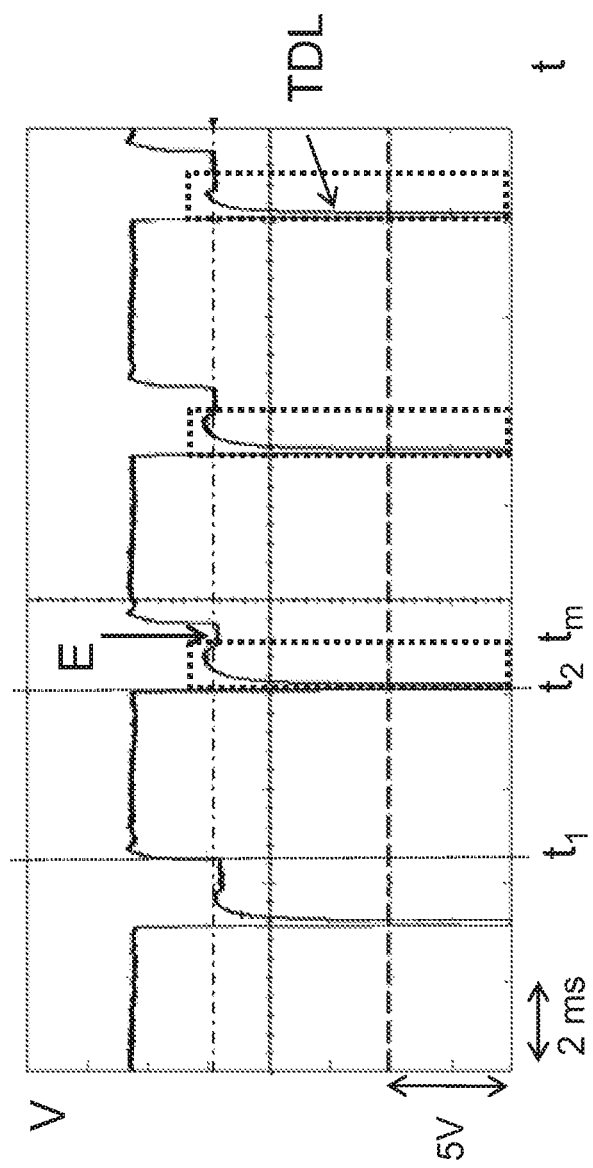
FIG. 2 is a diagram illustrating the time plot of a voltage in a motor according to the invention.

FIG. 2 shows the plot of the voltage V read on the terminals A and B of the electric motor 10 according to the ON and OFF cycles set by the PWM driving mode. Denoted by TDL is a transient, associated to a corresponding transient time interval, deriving from the presence of the inductance L. As shown, an electromotive force E is measured at a measurement time $t_m$ at the end of the transient TDL, which starts at start of the OFF time $t_2$.

In FIG. 2, purely by way of example, the time scale is 2 ms per division, while the voltage scale is 5 V per division. The voltage of the motor has a frequency of 200 Hz, with a duty cycle (ratio between the ON time $t_1$ and OFF time $t_2$) of 71%.

By controlling the values of the ON time $t_1$ and OFF time $t_2$ it is possible to keep the r.p.m. of the motor 10 constant—since during the period in which no voltage is applied to the motor 10, this, on account of the inertia of the system, tends to continue to turn—and obtain a precise and constant reading over time of the voltage V on the terminals A and B. Also the PWM technique for driving a d.c. electric motor to keep the velocity of rotation constant is, however, in itself known to the person skilled in the sector. From the voltage V of the motor 10 read at the measurement time $t_m$ the velocity of rotation w of the motor 10 itself is derived, according to the relation:

$$E=k\cdot\omega$$

where k is a constructional constant of the motor, i.e., linked to the parameters of construction of the motor 10, and ω is the r.p.m. of the motor 10, more precisely the angular velocity of its rotor. The conversion factor between the angle of rotation of the motor 10 and the linear translation of the window F of the vehicle is constant; hence it is possible, via appropriate calibration, to derive a constant of proportionality, denoted hereinafter by $K_e$, between the back electromotive force E read and the linear velocity of the window F, without knowing the physical parameters of the electric motor 10.

Hence, on the basis of the method proposed, the measurement of the position of a window F moved by an electric motor 10 is obtained by reading the voltage V applied to the d.c. electric motor, net of the parasitic parameters.

The electric motor 10 is a d.c. electric motor controlled by an electronic circuit equipped with microcontroller and specific software strategy, which enables and controls sliding, in two directions, of a surface of the window (made of glass or similar material) constrained along its path by two parallel guides. Sliding in either direction is driven by pressing electromechanical pushbuttons. This surface may be the glass of a window moved by the electrical power-window system located within the door of a vehicle with anti-pinch function or else the sun roof of a system for enabling sliding of an electrically openable sun roof.

Figure 3:
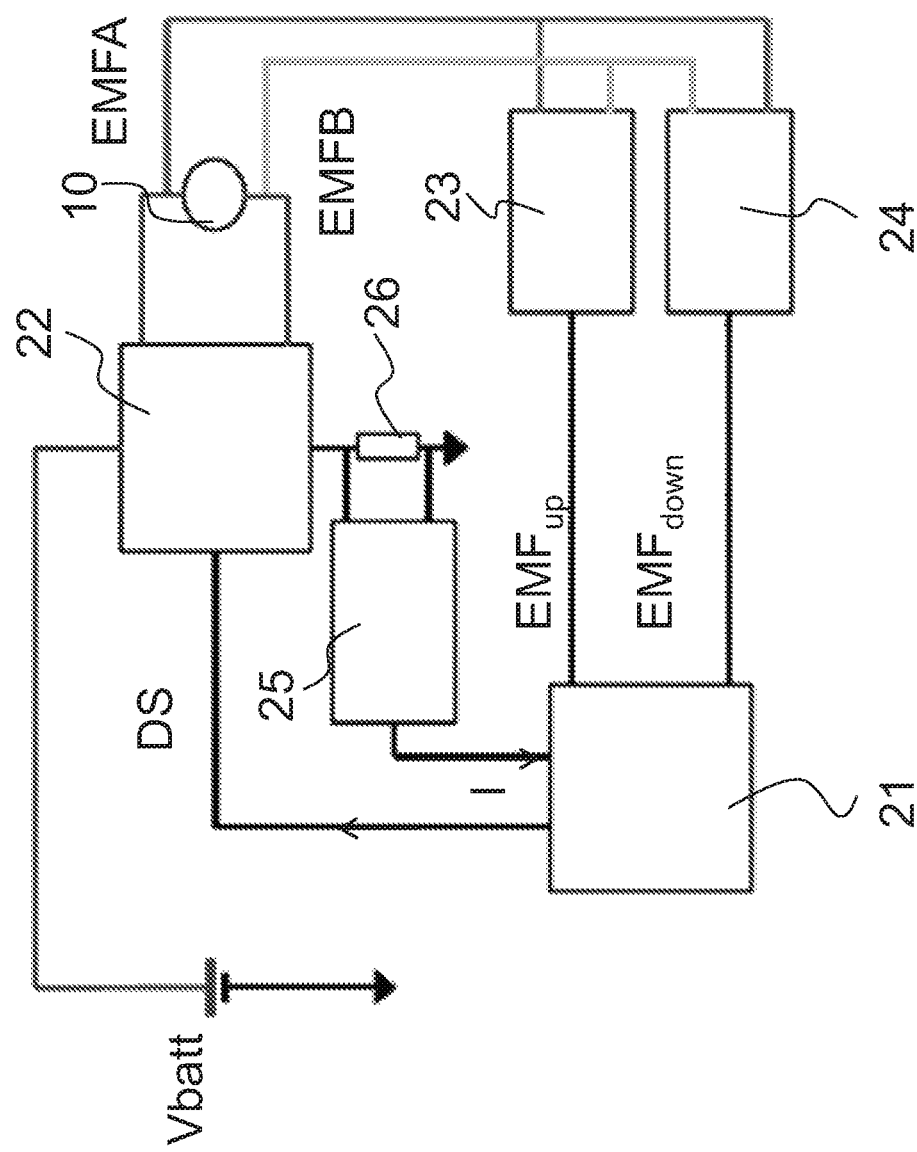
FIG. 3 is a block diagram of a control circuit of the apparatus according to the invention.

FIG. 3 is a schematic representation of a circuit device 20 for controlling a power-window apparatus with anti-pinch function. The control circuit comprises a microprocessor 21, which sends PWM control signals, designated by DS in FIG. 3, with ON and OFF times $t_1$ and $t_2$, to an H-bridge circuit 22, in particular supplied by a battery voltage Vbatt, which drives the electric motor 10. Acquired on the terminals A and B of the motor 10 are respective voltage values EMFA and EMFB, which are sent both to a first conditioning operational circuit 23 that computes the difference EMFA−EMFB, corresponding to a rotation of the motor for raising the window F, referred to as window-up signal $EMF_{UP}$, and to a second conditioning operational circuit 24, which computes the difference EMFB−EMFA, referred to as window-down signal $EMF_{DOWN}$, corresponding to a rotation of the motor for lowering the window F. The signals $EMF_{UP}$ and $EMF_{DOWN}$ are sent to the microprocessor 21, which receives, via a third conditioning operational circuit 25, a value of current I of the motor, measured via a shunt resistance 26 set between the H-bridge driving circuit 22 and ground. The current I of the motor 10 is calculated by the circuit 25 as ratio of the voltage detected by the circuit 25 across the shunt resistance 26 and the value of the shunt resistance 26 itself.

Less expensive variants are possible, in which the active conditioning operational circuits 23, 24, 25, which carry out operations of subtraction and division on the quantities at their inputs, are replaced by passive conditioning circuits, which simply carry out RC filtering. The corresponding filtered quantities are processed in the microprocessor 20; i.e., the operations of subtraction and division are carried out on the filtered back electromotive forces supplied by the respective RC filters that operate on the voltage acquired on the terminals A and B.

Figure 4:
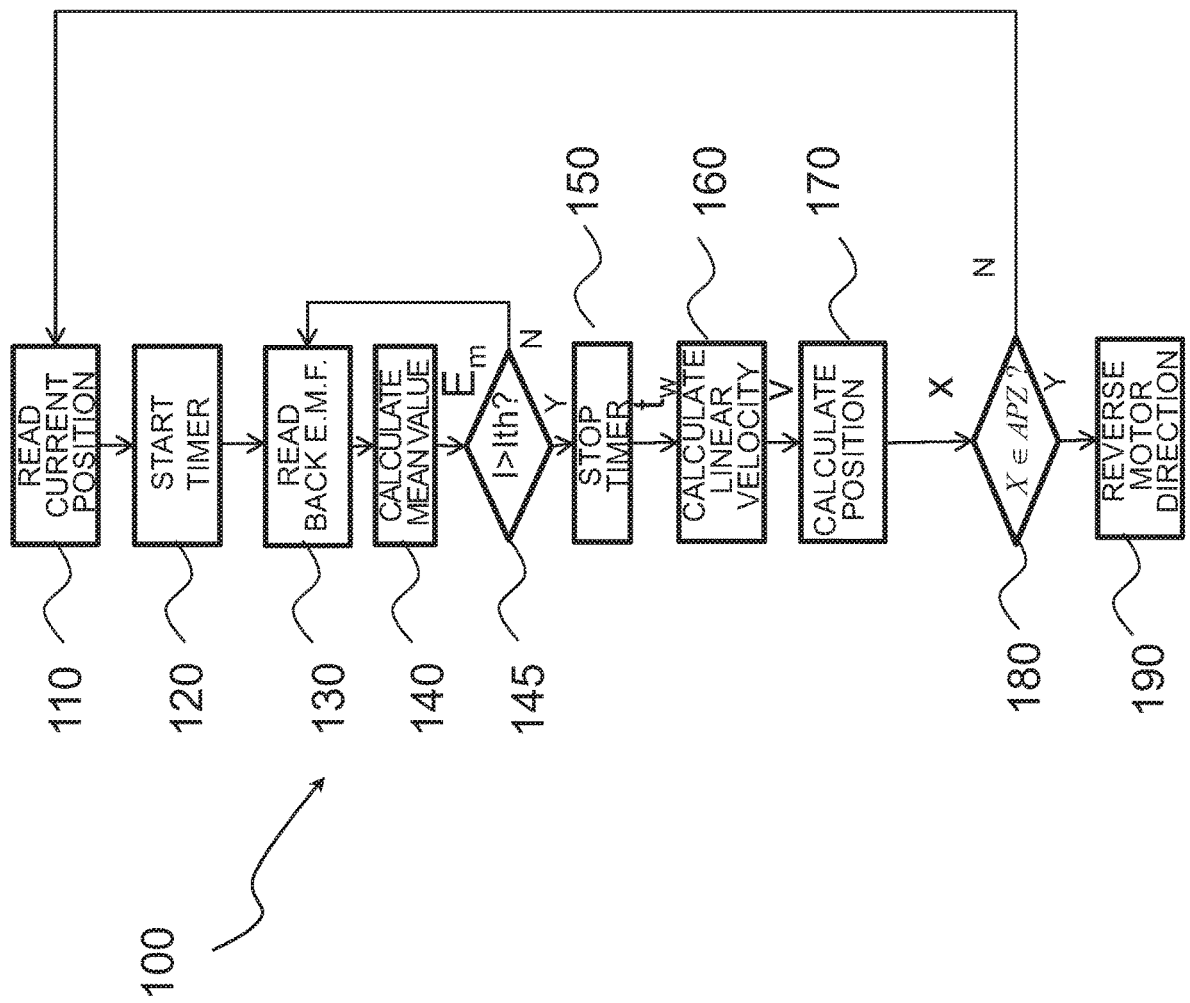
FIG. 4 is a flowchart of a method implemented by the apparatus according to the invention.

FIG. 4 shows a flowchart that represents operation of the system.

In a step 110, the current position of the window F is read by the microprocessor 21. This is done by reading, for example, a counter available in the microprocessor, which records the incremental displacements.

In a subsequent step 120, a timer is started in the microprocessor 21.

Then, in a step 130, a value of back electromotive force of the motor 10 is read, in particular the window-up signal $EMF_{UP}$ or the window-down signal $EMF_{DOWN}$ according to the direction of displacement of the window F, up or down.

In a step 140, a mean value $E_m$ is then calculated of the back electromotive force determined by the duty cycle, i.e., by the ON time $t_1$ and OFF time $t_2$, of PWM driving, i.e., of the signal DS. This value is a mean value $E_m$ in so far as, in actual fact, the value calculated is a value averaged over a plurality of periods of the PWM signal, for example taking into account the value of back electromotive force in the current period and the value of the previous period, and dividing by two. In a subsequent step 145, reading of the current I of the motor 10 is carried out via the microprocessor 21, and a condition is verified, whereby, as long as the current I of the motor 10 measured in the mean time by the microprocessor 21 is lower than a given threshold current $I_{th}$, or else—in a preferred variant that envisages joint checking of the state of activation of an electromechanical pushbutton for moving the window F—as long as the current I is lower than a given threshold current $I_{th}$ or the electromechanical pushbutton is activated for moving the window, the step 130 of measurement of the back electromotive force $E_m$ is repeated. When the current I of the motor 10 is higher than a threshold current $I_{th}$, or else, in the preferred variant referred to above, when the current I of the motor 10 is higher than a threshold current $I_{th}$ or the electromechanical pushbutton is activated for stopping the window F (for example, it is released), from step 145 control passes to a step 150 where the timer is stopped, the timer (in particular, via its own count) supplying a time $t_w$ of sliding of the window F, and the mean value of back electromotive force $E_m$ is acquired during execution of step 150.

In a step 160, the linear velocity v of the window F is then calculated as ratio between the back electromotive force $E_m$ measured and a coefficient of proportionality $K_e$.

In a step 170, the position X of the window F is then calculated as product of the linear velocity v of the window F and of the time $t_w$ of sliding of the window F. This position is calculated in an incremental way with respect to the position read in step 110. The procedure for reading the position is in fact incremental, and the current position at the end of the procedure 100 applied must be stored. The next reading must be added or subtracted (according to the direction) to/from the value previously stored.

The back electromotive force of the motor is given by the relation $E=K_e \cdot \omega$. Given a mean angular velocity $\omega_m$ of the motor, we have $\omega_m = E_m/K_e$ and the position X is equal to $t_w \cdot \omega_m$, i.e., to the product of the mean angular velocity $\omega_m$ of the motor and of the time $t_w$ of sliding of the window F. However, since the factor of conversion between rotation of the motor 10 and linear translation of the window F is constant, it is possible to operate with the linear velocity v, as indicated in steps 160, 170, thus obtaining, as illustrated hereinafter, the coefficient of proportionality $K_e$ via a calibration that takes into account the linear velocity v.

Finally, in a step 180 it is evaluated whether the position X of the window F obtained in step 170 falls within the anti-pinch zone APZ. If so, the direction of the motor 10 is reversed in step 190. If not, the position X is acquired, and control returns to step 110. It is to be noted that passage through step 190 is performed only if the movement of the window F is upwards.

In other words, via steps 130, 140, 145, the back electromotive force $E_m$ is measured, with a given sampling interval, until a condition on the current (possibly combined with a check on the pushbuttons) that identifies a possible pinching or jamming is verified, whilst a timer started in step 120 counts the time interval during which the measurement is active, i.e., the program cycles between steps 130, 140, and 145. When the condition on the current is verified, the timer 150 stops, and, on the basis of the time measured and the back electromotive force $E_m$ measured at the moment of arrest of the timer, the position X of the window F is calculated and is compared with the anti-pinch zone APZ.

The control circuit 20 carries out the anti-pinch function, with introduction of the parameter current I. During regular movement of the window, the d.c. electric motor absorbs, for example, a current I of approximately 4 A to 6 A; in the case of blocking, the current I rapidly passes to a value of approximately 12 A to 15 A.

In general, if the current on the load becomes higher than a predefined threshold, it may be concluded that there is a condition of pinching.

Hence, once, via the information on the position obtained by applying the procedure 100, it is ascertained that the window F is in the anti-pinch zone APZ, namely, comprised between 4 mm and 200 mm from the top end-of-travel, when a sudden increase, beyond the threshold, in the value of current I during raising of the window F, is detected by the microprocessor 21 of the electronic control system 20 of FIG. 3, the direction of motion of the window F is reversed (i.e., the window is lowered), thus enabling removal of the obstacle.

Figure 5:
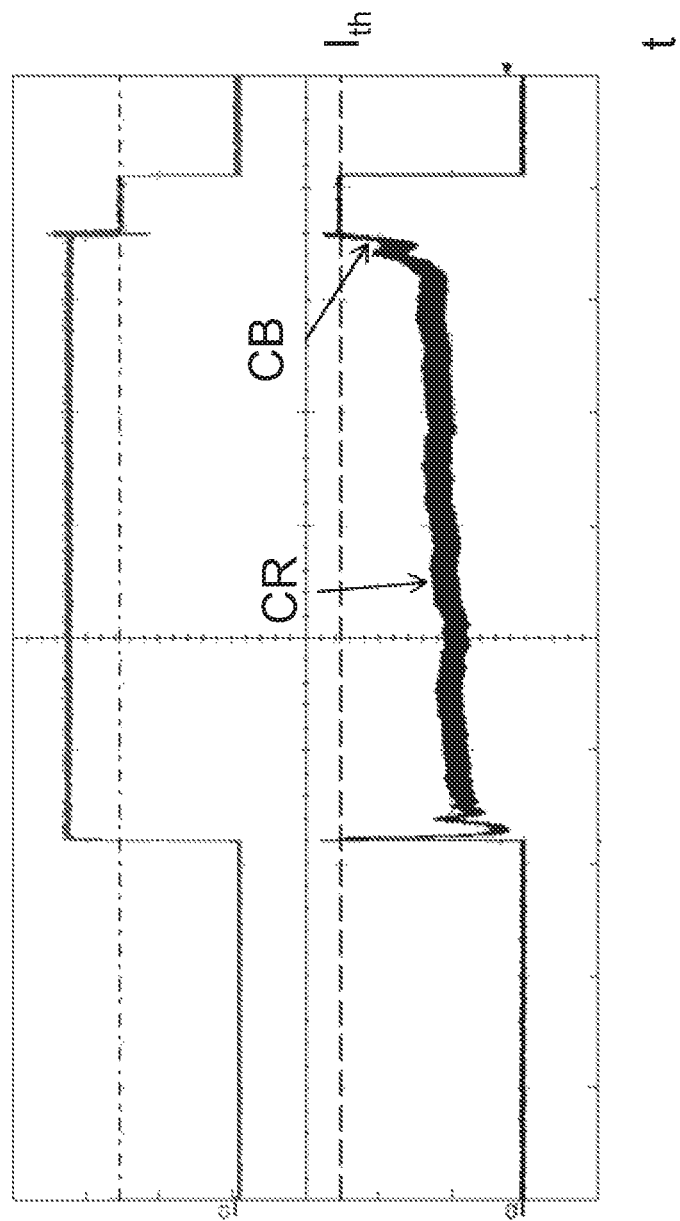
FIG. 5 is a diagram illustrating the plot of the voltage and of the current of the motor in a condition of pinching.
Figure 6:
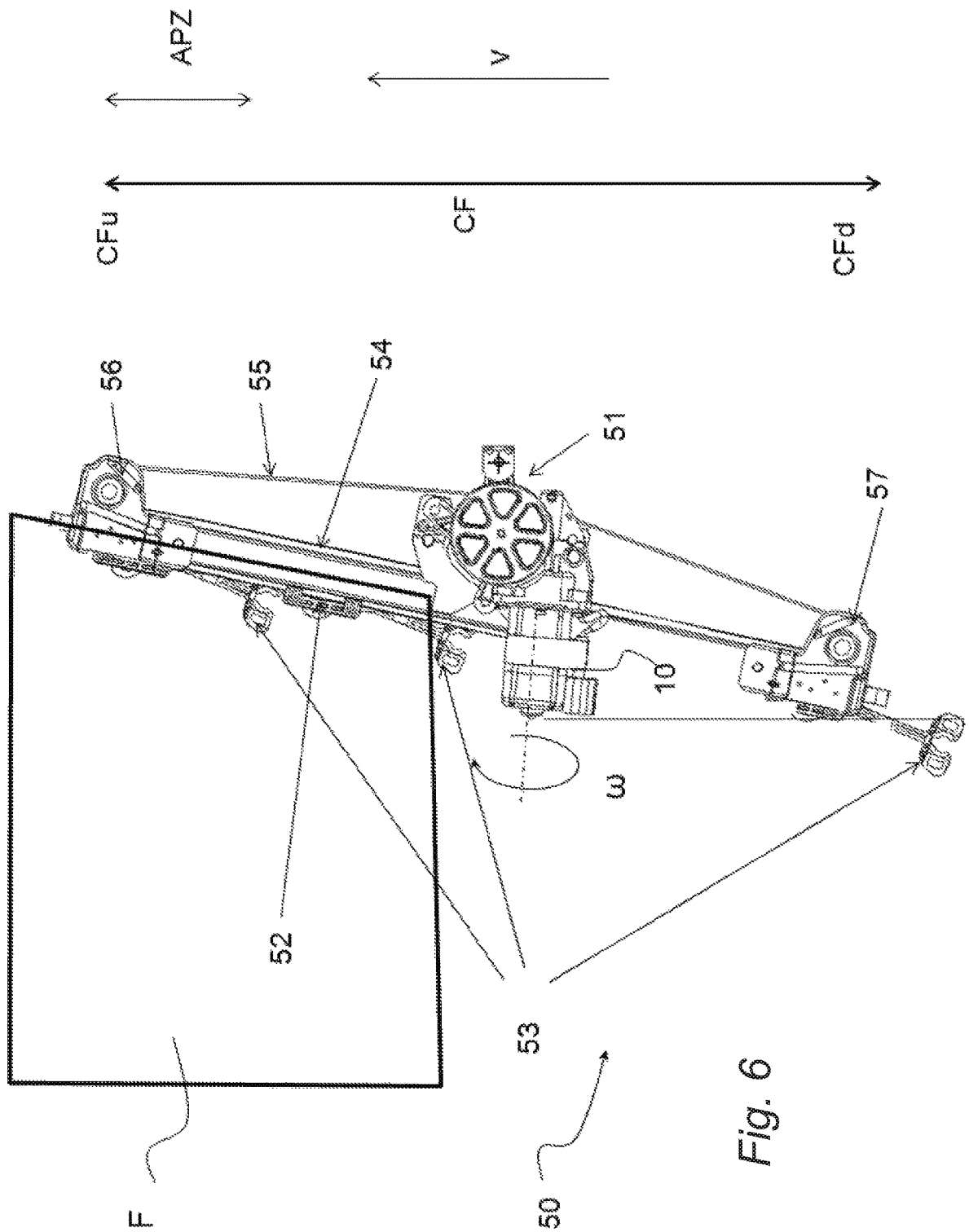
FIG. 6 represents a principle diagram of a power-window apparatus for a motor vehicle.

Illustrated in FIG. 5 are the plots of the voltage V of the motor 10 and of the current I of the motor 10. Designated by CR are the values of current during normal operation of the motor 10, whereas CB designates the sudden increase in the current I of the motor until the threshold value $I_{th}$ is exceeded, beyond which the microprocessor 10 drives reversal of rotation of the motor 10 (step 190 of FIG. 4).

Considering that the factor of conversion between rotation of the motor 10 and linear translation of the window is constant, via a calibration procedure it is possible to derive the coefficient $K_e$ of proportionality between the back electromotive force E read and the linear velocity v of the window F, without knowing the physical parameters of the motor 10.

The above procedure of calibration of the coefficient $K_e$ is performed as follows: in a first step, the value of the back electromotive force E is read after a full cycle of movement of the window F (for example, window up to top end-of-travel and window down to bottom end-of-travel), with a corresponding path P equal to $2 \cdot CF$, i.e., twice the travel CF of the window F, for a cycle time $t_c$, which can be measured, for example, by the same timer as that of step 120 (in step 145—in this case, arrest of movement at end-of-travel enables step 150 of arrest of the timer), and a value of back electromotive force $E_m$ is obtained for upward sliding of the window ($EMF_{UP}$) and a value of back electromotive force $E_m$ is obtained for downward sliding of the window ($EMF_{DOWN}$).

The linear velocity v of the window F is linked to the following relation:

$$v = P/t_c$$

while the constant of proportionality $K_e$ is $$K_e = E/v$$

The back electromotive force E may be calculated by distinguishing between upward sliding $EMF_{UP}$ and downward sliding $EMF_{DOWN}$, which are read during a cycle.

More specifically, for example, via the calibration procedure, the electromotive force E corresponding upward sliding $EMF_{UP}$ is calculated for a movement along half of the path P, i.e., P/2 (equal to the travel CF) during a window-up cycle time $t_{cup}$. This yields a window-up speed $v_{up}$ $$v_{up} = P/2t_{cup}$$

and a window-up constant $K_{eup}$ $$K_{eup} = EMF_{UP}/v_{up}$$

Of course, as in the cases represented for the procedure 100, the value of electromotive force E for upward sliding $EMF_{UP}$ is in actual fact a mean value.

Then, the same operations are carried out for downward sliding of the window F, along half of the path, P/2, for a window-down cycle time $t_{cdown}$. This yields a window-down speed $v_{down}$ $$v_{down} = P/2t_{cdown}$$

and a window-down constant $K_{edown}$ $$K_{edown} = EMF_{DOWN}/v_{down}$$

The coefficient of proportionality $K_e$ used by the procedure 100 is finally calculated as average between the window-up coefficient $K_{eup}$ and the window-down coefficient $K_{edown}$.

Hence, from the foregoing description, the advantages of the solution proposed emerge clearly.

The device and method described advantageously enable exact determination of the position of the window along its path without the aid of external sensor using the back electromotive force of the motor. This results in a simplification (from the automotive standpoint) of the system for verifying the position of the window or sun roof, in so far as no sensor is envisaged, or rather the motor operates as sensor.

Furthermore, this determination of the position is advantageously rendered independent of the typical (and parasitic) parameters of the system, in particular of the electric motor, thanks to a self-calibration procedure, so that there is no constraint on the choice of the electric motor used.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. An anti-pinch circuit device for an apparatus for automatic movement of sliding windows in a motor vehicle comprising a d.c. electric motor that moves a window (F) so that it slides along guides, said device comprising an electronic control module for controlling said d.c. electric motor, in particular a microprocessor, said electronic control module acting to measure a current (I) of said motor and a position (X) of said window (F), said control module drives reversal of operation of the electric motor if it is verified that said current (I) is higher than a threshold current ($I_{th}$) and said position (X) of said window (F) falls within a given zone (APZ) of a path (P) of movement of the window, wherein said anti-pinch circuit device measures a back electromotive force (E; $E_m$) of the motor, obtaining (140) a value of said back electromotive force (E; Em), and the electronic control module calculates the position of the window (F) as a function of said measured value of said back electromotive force (E; $E_m$) of the motor, wherein said electronic control module is configured to:

read a starting position of the window (F);

start a timer;

read a value of back electromotive force (E; $EMF_{UP}$, $EMF_{DOWN}$);

calculate a mean value ($E_m$) of the back electromotive force;

verify the value of said current (I) of the motor and, if said current (I) is lower than a threshold current ($I_{th}$), returning to the step of reading the value of back electromotive force (E; $EMF_{UP}$, $EMF_{DOWN}$);

if the current (I) of the motor is higher than a threshold current ($I_{th}$), stopping the timer, obtaining a time ($t_w$) of sliding of the window (F);

calculate a speed of the window (v) as ratio between the back electromotive force ($E_m$) measured and a coefficient of proportionality ($K_e$) associated to the automatic-movement apparatus; and calculate the position of the window (F) as product of said speed of the window (v) and of the time ($t_w$) of sliding of the window (F).

2. The device as set forth in claim 1, further including a module for measuring the current (I) of the electric motor and respective modules for measuring the back electromotive force ($EMF_{UP}$) of the motor during sliding upwards or towards the closing end-of-travel (CFu) and the back electromotive force ($EMF_{DOWN}$) of the motor during sliding downwards or towards opening end-of-travel (CFd) of the window (F).

3. The device as set forth in claim 1, wherein:

said operation of verifying the value of the current (I) of the motor further comprises verifying jointly the state of operation of an electromechanical pushbutton for moving the window (F).

4. The device as set forth in claim 1, wherein said control module calculates said coefficient of proportionality ($K_e$) of the system via the steps of:

reading the value of the back electromotive force ($E_m$) after completing a full cycle of movement of the window with a corresponding path (P) in a cycle time ($t_c$) that is measured;

calculating a speed of the window (v) as ratio between the path (P) and the cycle time ($t_c$); and calculating the coefficient of proportionality ($K_e$) as the ratio between said back electromotive force (E) read and said speed (v).

5. The device as set forth in claim 4, wherein said device:

reads the back electromotive force for upward sliding ($EMF_{UP}$) of the window (F), measures a window-up cycle time ($t_{cup}$) and calculates a corresponding window-up speed ($v_{up}$) and a corresponding window-up constant ($K_{eup}$);

reads the electromotive force for downward sliding ($EMF_{DOWN}$) of the window (F), measures a window-down cycle time ($t_{cdown}$) and calculates a corresponding window-down speed ($v_{down}$) and a corresponding window-down constant ($K_{edown}$); and calculates said coefficient of proportionality ($K_e$) as average between said window-up coefficient ($K_{eup}$) and said window-down coefficient ($K_{edown}$).

6. The device as set forth in claim 1, wherein said device drives said motor via a PWM modulation (DS) and measures the back electromotive force (E) at the instant when the voltage applied on the terminals of the motor is zero and an inductive transient (TDL) of the motor terminates.

7. An anti-pinch method for an apparatus for automatic movement of sliding windows in a motor vehicle said method implements one or more of the operations carried out by the device as set forth in claim 1.

* * * * *